US008855087B2

(12) United States Patent
Banerjee et al.

(10) Patent No.: US 8,855,087 B2
(45) Date of Patent: Oct. 7, 2014

(54) WIRELESS ACCESS POINT SUPPORTING CONTROL BY MULTIPLE APPLICATIONS

(75) Inventors: Anirban Banerjee, Issaquah, WA (US);
David A. Roberts, Redmond, WA (US);
Hui Shen, Sammamish, WA (US);
Shawn Jiang, Lynnwood, WA (US);
Saurabh Mahajan, Redmond, WA
(US); Chris Gual, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1211 days.

(21) Appl. No.: 12/338,277

(22) Filed: Dec. 18, 2008

(65) Prior Publication Data

US 2010/0157960 A1    Jun. 24, 2010

(51) Int. Cl.
*H04W 4/00* (2009.01)
*H04B 1/16* (2006.01)
*H04L 29/08* (2006.01)
*H04W 88/08* (2009.01)

(52) U.S. Cl.
CPC ............. *H04L 67/025* (2013.01); *H04W 88/08* (2013.01); *H04L 67/1095* (2013.01); *H04L 67/34* (2013.01)
USPC ........................................ 370/338; 455/343.1

(58) Field of Classification Search
USPC .......................... 370/311, 312, 327–329, 338; 455/343.1–343.6; 340/7.32–7.38
See application file for complete search history.

(56) References Cited

U.S. PATENT DOCUMENTS

| | | | |
|---|---|---|---|
| 4,210,780 A | 7/1980 | Hopkins et al. | |
| 5,504,775 A | 4/1996 | Chouly et al. | |
| 5,790,516 A | 8/1998 | Gudmundson et al. | |
| 5,838,720 A | 11/1998 | Morelli | |
| 5,867,478 A | 2/1999 | Baum et al. | |
| 6,175,550 B1 | 1/2001 | Van Nee | |
| 6,304,611 B1 | 10/2001 | Miyashita et al. | |
| 6,553,534 B2 | 4/2003 | Yonge et al. | |
| 6,609,039 B1 | 8/2003 | Schoen | |

(Continued)

FOREIGN PATENT DOCUMENTS

| | | |
|---|---|---|
| CN | 1816789 | 8/2006 |
| EP | 1 156 598 A2 | 11/2001 |

(Continued)

OTHER PUBLICATIONS

"Wireless 802.11n PCI Card User Manual, Model 523981," Intellinet Network Solutions, http://www.intellinet-network.com/download/281-523981_manual.pdf, downloaded Oct. 31, 2008.

(Continued)

*Primary Examiner* — Afshawn Towfighi
(74) *Attorney, Agent, or Firm* — John Jardine; Kate Drakos; Micky Minhas

(57) ABSTRACT

A computing device configurable as a wireless network access point that can be controlled from multiple applications. The computing device provides an interface through which applications may input commands to change the state of the access point. The interface responds to these commands and other events, such as association or disassociation of a wireless client, in a manner that does not disrupt the applications or devices using the access point. To determine an appropriate response to any event, the interface may maintain state information, including a count of the number of applications and/or wireless devices that have taken action indicating an operating state of the wireless access point.

19 Claims, 7 Drawing Sheets

(56) References Cited

U.S. PATENT DOCUMENTS

| | | |
|---|---|---|
| 6,654,431 B1 | 11/2003 | Barton et al. |
| 6,726,297 B1 | 4/2004 | Uesugi |
| 6,763,072 B1 | 7/2004 | Matsui et al. |
| 6,810,006 B2 | 10/2004 | Michon et al. |
| 6,870,808 B1 | 3/2005 | Liu et al. |
| 6,882,851 B2 | 4/2005 | Sugar et al. |
| 6,904,283 B2 | 6/2005 | Li et al. |
| 6,934,246 B2 | 8/2005 | Park |
| 6,934,340 B1 | 8/2005 | Dollard |
| 6,952,454 B1 | 10/2005 | Jalali et al. |
| 6,961,388 B2 | 11/2005 | Ling et al. |
| 6,976,202 B1 | 12/2005 | Rezvani et al. |
| 6,987,729 B1 | 1/2006 | Gopalakrishnan et al. |
| 7,012,883 B2 | 3/2006 | Jalali et al. |
| 7,020,071 B2 | 3/2006 | Mujtaba |
| 7,020,073 B2 | 3/2006 | Kadous et al. |
| 7,043,023 B2 | 5/2006 | Watanabe et al. |
| 7,043,681 B2 | 5/2006 | Kroeger |
| 7,047,032 B2 | 5/2006 | Yun |
| 7,072,413 B2 | 7/2006 | Walton et al. |
| 7,075,967 B2 | 7/2006 | Struhsaker et al. |
| 7,076,246 B2 | 7/2006 | Chitrapu |
| 7,126,984 B2 | 10/2006 | Wang |
| 7,151,925 B2 | 12/2006 | Ting et al. |
| 7,164,649 B2 | 1/2007 | Walton et al. |
| 7,206,350 B2 | 4/2007 | Korobkov et al. |
| 7,206,840 B2 | 4/2007 | Choi et al. |
| 7,216,365 B2 | 5/2007 | Bhagwat et al. |
| 7,284,062 B2 | 10/2007 | Krantz et al. |
| 7,292,545 B2 | 11/2007 | Maki et al. |
| 7,349,544 B2 | 3/2008 | Tiwari |
| 7,522,564 B2 | 4/2009 | Kakumaru et al. |
| 7,551,641 B2 | 6/2009 | Pirzada et al. |
| 7,586,864 B2 | 9/2009 | Aoki |
| 7,944,867 B2 | 5/2011 | Usuba |
| 7,970,085 B2 | 6/2011 | Hassan et al. |
| 2002/0141446 A1 | 10/2002 | Koga |
| 2002/0157058 A1 | 10/2002 | Ariel |
| 2002/0188723 A1 | 12/2002 | Choi et al. |
| 2003/0026200 A1 | 2/2003 | Fu et al. |
| 2003/0058786 A1 | 3/2003 | Sato et al. |
| 2003/0123383 A1 | 7/2003 | Korobkov et al. |
| 2003/0154233 A1 | 8/2003 | Patterson |
| 2004/0005010 A1 | 1/2004 | He et al. |
| 2004/0008618 A1 | 1/2004 | Shirakata et al. |
| 2004/0027997 A1 | 2/2004 | Terry et al. |
| 2004/0029575 A1 | 2/2004 | Mehta |
| 2004/0103278 A1 | 5/2004 | Abhishek et al. |
| 2004/0151108 A1 | 8/2004 | Claret et al. |
| 2004/0151109 A1 | 8/2004 | Batra et al. |
| 2004/0192284 A1 | 9/2004 | Vaisanen et al. |
| 2004/0235536 A1 | 11/2004 | Kim et al. |
| 2004/0252775 A1 | 12/2004 | Park |
| 2004/0252781 A1 | 12/2004 | Park |
| 2005/0002325 A1 | 1/2005 | Giannakis et al. |
| 2005/0025039 A1 | 2/2005 | Hwang et al. |
| 2005/0027789 A1 | 2/2005 | Luo et al. |
| 2005/0063345 A1 | 3/2005 | Wu et al. |
| 2005/0078624 A1 | 4/2005 | Shu et al. |
| 2005/0078759 A1 | 4/2005 | Zhang |
| 2005/0099937 A1 | 5/2005 | Oh et al. |
| 2005/0111462 A1 | 5/2005 | Walton et al. |
| 2005/0117661 A1 | 6/2005 | Kim |
| 2005/0130684 A1 | 6/2005 | Kim et al. |
| 2005/0141649 A1 | 6/2005 | Tanabe |
| 2005/0152466 A1 | 7/2005 | Maltsev et al. |
| 2005/0154933 A1* | 7/2005 | Hsu et al. ............. 713/320 |
| 2005/0157670 A1 | 7/2005 | Tang et al. |
| 2005/0160428 A1 | 7/2005 | Ayachitula et al. |
| 2005/0197132 A1 | 9/2005 | Lee et al. |
| 2005/0228850 A1 | 10/2005 | Zhu et al. |
| 2005/0237989 A1 | 10/2005 | Ahn et al. |
| 2005/0245197 A1 | 11/2005 | Kadous et al. |
| 2006/0009209 A1 | 1/2006 | Rieser et al. |
| 2006/0034382 A1 | 2/2006 | Ozluturk et al. |
| 2006/0039337 A1 | 2/2006 | Hodoshima |
| 2006/0045001 A1 | 3/2006 | Jalali |
| 2006/0046716 A1 | 3/2006 | Hofstaedter et al. |
| 2006/0078059 A1 | 4/2006 | Ok et al. |
| 2006/0083210 A1 | 4/2006 | Li et al. |
| 2006/0121916 A1 | 6/2006 | Aborn et al. |
| 2006/0128318 A1 | 6/2006 | Agarossi et al. |
| 2006/0135075 A1 | 6/2006 | Tee et al. |
| 2006/0154691 A1 | 7/2006 | Tang et al. |
| 2006/0159120 A1 | 7/2006 | Kim |
| 2006/0171388 A1 | 8/2006 | Ikeda |
| 2006/0171445 A1 | 8/2006 | Batra et al. |
| 2006/0188031 A1 | 8/2006 | Liu |
| 2006/0193295 A1 | 8/2006 | White et al. |
| 2006/0203850 A1 | 9/2006 | Johnson et al. |
| 2006/0211387 A1 | 9/2006 | Pisek et al. |
| 2006/0211395 A1 | 9/2006 | Waltho |
| 2006/0221927 A1 | 10/2006 | Yamada et al. |
| 2006/0250944 A1 | 11/2006 | Hong et al. |
| 2006/0269005 A1 | 11/2006 | Laroia et al. |
| 2006/0285527 A1 | 12/2006 | Gao et al. |
| 2006/0285528 A1 | 12/2006 | Gao et al. |
| 2006/0287001 A1 | 12/2006 | Budampati et al. |
| 2007/0009056 A1 | 1/2007 | Yeon et al. |
| 2007/0016413 A1 | 1/2007 | Seo et al. |
| 2007/0049339 A1 | 3/2007 | Barak et al. |
| 2007/0053315 A1 | 3/2007 | Sugaya |
| 2007/0055501 A1 | 3/2007 | Aytur et al. |
| 2007/0078924 A1 | 4/2007 | Hassan et al. |
| 2007/0133387 A1 | 6/2007 | Arslan et al. |
| 2007/0171884 A1 | 7/2007 | Irie et al. |
| 2007/0189249 A1 | 8/2007 | Gurevich et al. |
| 2007/0286136 A1 | 12/2007 | Rittle et al. |
| 2008/0013558 A1* | 1/2008 | Ito et al. ............. 370/404 |
| 2008/0026788 A1 | 1/2008 | Hamada |
| 2008/0031208 A1 | 2/2008 | Abhishek et al. |
| 2008/0072292 A1 | 3/2008 | Narjala |
| 2008/0232286 A1 | 9/2008 | Habetha et al. |
| 2008/0232340 A1 | 9/2008 | Wan et al. |
| 2009/0262849 A1 | 10/2009 | Jo et al. |
| 2010/0208852 A1 | 8/2010 | Feher |

FOREIGN PATENT DOCUMENTS

| | | |
|---|---|---|
| JP | 2004/128949 | 4/2004 |
| JP | 2006-332844 A1 | 7/2006 |
| JP | 2003-348104 A1 | 5/2012 |
| KR | 1020050052847 A | 6/2005 |
| NZ | 505658 | 2/2003 |
| WO | WO 02093839 A2 | 11/2002 |
| WO | WO 2005-011183 A2 | 2/2005 |
| WO | WO 2005125250 A1 | 12/2005 |
| WO | WO 2005076557 | 8/2007 |

OTHER PUBLICATIONS

Dennis and Ford, "The Wireless Ubiquitous Surveillance Testbed," Naval Postgraduate School Thesis, Mar. 2003, Monterey, California, http://stinet.ditic.mil/diticrev/PDFs/ADA414846.pdf, downloaded Oct. 31, 2008.

Sutherland, E., "The Software Access Point," ISP News, May 2, 2002, http://www.isp-planet.com/news/2002/msft_020502.html, downloaded Oct. 31, 2008.

Churchill, S., "Software Access Point Roundup," Jan. 12, 2004, http://www.dailywireless.org/2004/01/12/software-access-point-roundup/, Oct. 31, 2008.

"Soft AP Solutions," Marvell, http://www.marvell.com/products/wireless/softap.jsp, Oct. 31, 2008.

International Search Report and Written Opinion for International Application No. PCT/US2009/064844 mailed May 28, 2010.

About SDR Technology, 1 http://www.sdrforum.org/pages/aboutSdrTech/aboutSdrTech.asp, 1 pg, 2007.

Atarashi, H., "Broadband packet wireless access appropriate for high-speed and high-capacity throughput," Vehicular Technology Conference, 2001, pp. 566-570, vol. 1, Issue 2001.

Baumgartner et al., "Performance of Forward Error Correction for IEEE 802.16e," 10th International OFDM Workshop, Hamburg, Germany, Aug. 2005.

(56) References Cited

OTHER PUBLICATIONS

Bletsas et al., "Efficient Collaborative (Viral) Commuinication in OFDM Based WLANS", Media Laboratory, MIT, {aggelos,lip}@media.mit.edu.

Brodersen et al., "Corvus: a cognitive radio approach for usage of virtual unlicensed spectrum." Online. http://www.tkn.tu-berlin.de/publications/papers/CR_White_paper_final.pdf, 2004.

Cabric et al., "A Cognitive Radio Approach for Usage of Virtual Unlicensed Spectrum," In Proc. of 14th IST Mobile Wireless Communications Summit 2005, Dresden Germany, Jun. 2005, 4 pages unnumbered.

Chiani et al., "Ultra Wide Bandwidth Communications towards Cognitive Radio," EMC Europe Workshop, http://www-site.deis.unibo.it/Staff/giorgetti/pubblicazioni/Conferences/emc05_mcaggl.pdf, 2005, pp. 114-117, Rome, Italy.

Goeckel et al., "On the Design of Multidimensional Signal Sets for OFDM Systems", IEEE, vol. 50 No. 3, pp. 442-452, Mar. 2002.

Goeckel, "Coded Modulation With Non-Standard Signal Sets for Wireless OFDM", IEEE, pp. 791-795, 1999.

Han and Choi, "Performance Analysis of Sleep Mode Operation in IEEE 802.16e Mobile Broadband Wireless Access Systems," http://www.mwnl.snu.ac.kr/~schoi/publication/Conferences/06-VTC-16e.pdf.

Ingersoll-Rand, "Locking/Unlocking a Wyreless Access Point Module (WAPM) Upon Demand," Application Note: A664-007-A, Schlage Wyreless Access, pp. 1-3 (2003-2004), http://www.ir-swa.com/pdfs/A664-007-A.pdf.

International Search Report from International Application No. PCT/US2007/010020, Search dated Nov. 5, 2007.

International Search Report from International Application No. PCT/US2007/085556, Search dated Mar. 26, 2008.

International Search Report from International Application No. PCT/US2007/011642, Search dated Sep. 28, 2007.

International Search Report from International Application PCT/US2007/010021, Search dated Oct. 17, 2007.

Johnsson, "HiperLAN/2—The Broadband Radio Transmission Technology Operating in the 5 GHz Frequency Band," HiperLAN/2 Global Forum, 1999, Version 1.0.

Kravets and Krishnan, "Power Management Techniques for Mobile Communication," http://citeseer.ist.psu.edu/cache/papers/cs/27529/http:zSzzSzwww-2.cs.cmu.eduzSzafszSzcs.cmu.eduzSzuserzSzsatyazSzWebSzMCSALINKzSzPAPERSzSzkravets98.pdf/kravets98power.pdf, pp. 157-168 (1998).

Krenik et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN:1-59593-058-2.

Lawrey et al., "Adaptive Frequency Hopping for Multiuser OFDM," Second International Conference on Information, Communications & Signal Processing, ICICS '99, Singapore, Dec. 7-10, 1999.

Li et al., "Clustered OFDM with Channel Estimation for High Rate Wireless Data," IEEE, 1999, pp. 43-50.

Mitola et al., Absract from "Cognitive Radio: Making Software Radios More Personal," Personal Communications, IEEE, Aug. 1999, vol. 6, Issue 4, pp. 13-18, Stockholm, Sweden, ISSN: 1070-9916.

Mitola, III et al., "Cognitive Radio An Integrated Agent Architecture for Software Defined Radio," *Royal Institute of Technology (KTH)*, Teleinformatics Electrum 204, SE-164 40 Kista Sweden, pp. title page through 304, May 8, 2000.

Okada, et al., "Pre-DFT Combining Space Diversity Assisted COFDM," IEEE Tranactions on Vehicular Technology, vol. 50, No. 2, pp. 487-496, Mar. 2001.

Orthogonal Frequency Division Multiple Access, Wikipedia Online Encyclopedia; retrieved from http://en.wikipedia.org/wiki/ofdma, published Nov. 25, 2006, downloaded on Dec. 12, 2006, pp. 1-3.

Pottie, "Wireless Multiple Access Adaptive Communications Techniques," Online. http://www.ee.ucla.edu/~pottie/papers/encycl.pdf, 1999.

Sereni et al., "A Software Radio OFDM Transceiver for WLAN Applications", Electronic and Information Engineering Department(DIEI)—University of Perugia—Italy, pp. 1-14, Apr. 2001.

She et al., "Adaptive Turbo Coded Modulation for OFDM Transmissions," Communication Technology Proceedings, 2003. ICCT 2003, Apr. 9-11, 2003, pp, 1491-1495, vol. 2, Beijing China.

Software Defined Radio, http://www.altera.com/end-markets/wireless/software/sdr/wir-sdr.html, 4 pgs.

Software defined radio, http://www.wipro.com/webpages/insights softwareradio.htm, 1 pg, 2007.

Tewfik et al., "High Bit Rate Ultra-Wideband OFDM," Global Telecommunications Conference, 2002. GLOBECOM apos;02. IEEE, Nov. 2002, pp. 2260-2264, 2264, vol. 3.

Wahlqvist et al., "A Conceptual Study of OFDM-based Multiple Access Schemes," Telia, Jun. 5, 1996. http://www.es.lth.se/home/oes/pdfs/etsil.pdf.

Wang et al., "Complex-Field Coding for OFDM Over Fading Wireless Channels," IEEE Transactions on Information Theory, Mar. 2003, pp. 707-720, vol. 49, No. 3.

Wong et al., "Multiuser OFDM with Adaptive Subcarrier, Bit, and Power Allocation," *IEEE Journal on Selected Areas in Communications*, vol. 17, No. 10, Oct. 1999, pp. 1747-1758.

Written Opinion from International Application No. PCT/US2007/010020, Search dated Nov. 5, 2007.

Written Opinion from International Application No. PCT/US2007/011642, Search dated Sep. 28, 2007.

Written Opinion from International Application No. PCT/US2007/085556, Search dated Mar. 26, 2008.

Written Opinion from International Application PCT/US2007/010021, Search dated Oct. 17, 2007.

Youngblood, "A Software-Defined Radio for the Masses, Part 1," http://www.ece.jhu.edu/~cooper/SWRadio/Yblood1.pdf, Jul./Aug. 2002, pp. 1-9.

Zhang et al., "Adaptive OFDM System Design for Cognitive Radio," In: 11th International OFDM-Workshop, Aug. 30-31, 2006, Hamburg, Germany, pp. 91-95, IEEE Communications Society.

Yoshihiro Matsuno, Japanese Office Action, Patent application No. 2011-542181, mailed Jan. 30, 2014.

Yoshihiro Matsuno, Japanese Office Action, Patent App. No. 2011-542181, Jun. 4, 2013.

China Office Action, Patent App. No. 200980151836.9, Jun. 6, 2013.

\* cited by examiner

WIRELESS ACCESS POINT SUPPORTING CONTROL BY MULTIPLE APPLICATIONS

BACKGROUND

Computer users frequently have a need to connect their computer to other computing devices. For example, a user may wish to transfer audio files to his MP3 player, synchronize his calendar and contact list on his PDA device with that on his computer, or print a document onto his printer. The use of wireless communication for connections between computing devices has resulted in increased flexibility and mobility for computer users.

Wireless connections between a computer and another computing device may be made in a variety of ways. Computing devices may communicate directly with one another using a wireless peer-to-peer protocol. For example, devices suited for low data rates may communicate over a protocol such as Bluetooth or ZigBee. Some devices also support Wi-Fi protocol ad-hoc mode, which is another example of a peer-to-peer protocol, as it supports devices communicating directly with one another.

Devices supporting the Wi-Fi protocol may also operate in infrastructure mode, in which they do not connect directly to one another as in a peer-to-peer protocol, but communicate over a wireless local area network (WLAN). In a typical WLAN, a wireless client, such as a computer or a device (e.g., MP3 player, PDA), connects to an access point (AP), and communication is enabled between the client and a network through the AP.

Wireless access points frequently advertise their presence by broadcasting beacons at regular intervals. The broadcasted beacons may enable wireless clients to locate an access point and may also serve as a timing mechanism so that communications to and from devices connected in the network may be synchronized. APs may be self-contained hardware devices. Alternatively, computing devices (e.g., laptops or mobile phones) can be adapted to act as APs through the use of software. Such software-based access points or "soft APs" may allow a wireless client to access services not only on a network to which the computing device is connected but also on the computing device itself.

SUMMARY

A computer configured to operate as wireless access point may serve as a wireless host to a number of devices, each of which may interact with one or more applications executing on the computer. An interface to the access point conditionally responds to events that can alter the operating state of the access point. Processing in response to such events places the access point in a state in which it can satisfy the requirements of each of the one or more applications. The events to which the interface responds may include commands from applications to set the state of the access point or indications that wireless devices have associated or disassociated from the access point.

Processing in response to these events may be based on the nature of the event, the operating state of the access point and other state information, such as a number of previous commands processed.

In some embodiments, the access point supports multiple operating states, including an active state in which the access point both beacons and listens for association requests from wireless devices, an inactive state in which the access point neither beacons nor listens for association requests from wireless devices and a silent state of operation in which the access point listens for association requests from wireless devices without beaconing.

Accordingly, when an application executing on the computer, such as a syncing application for a PDA device, sends a start command over the interface to the access point, the wireless access point may update state information, and transition to the silent state, in which it listens for connection requests from devices. The start command may be sent when the syncing application starts execution, indicating a request to communicate with a device, such as the PDA device. While the hosted access point is in the silent state, when the application sends an advertise command over the application programming interface, the hosted access point may update its state information and transition to the active state. The hosted access point may also transition to active state when a device successfully associates with the computer.

Conversely, while the hosted access point is in an active state, if a device disassociates itself from the access point, or if an application sends a hide network command over the interface to the access point, the access point may update its state information. Based on the state information, the access point may transition back to the silent state. Though, for some values of the state information, the access point may not change state. Similarly, while the device is in the silent state, if an application sends a stop command over the interface to the access point, the wireless access point may update its state information. Based on the state information, the wireless access point may transition back to the inactive state. Though, for some values of the state information, the access point may not change state.

The foregoing is a non-limiting summary of the invention, which is defined by the claims below.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

The inventors have recognized and appreciated that improved control mechanisms for wireless access points may simplify their use and increase the number of applications that can use wireless communications. By providing a control interface for a wireless access point that conditionally responds to events, applications can be written more simply while still taking advantage of the functionality of the wireless access point. Nonetheless, multiple applications concurrently using an access point to exchange data with other devices wirelessly can perform in a more intuitive fashion by avoiding conflicts between those applications as they use the wireless access point functionality. As a result, wireless technology may be more readily applied to control, program, or transfer data between devices and applications on a computer. This capability can be used, for example, to synchronize wireless devices, such as PDAs or smart phones, with applications on a computer, or to wirelessly access devices, such as printers.

In some embodiments, an improved control interface is provided for a wireless access point, such as may be hosted on a computing device that also hosts multiple applications, each of which may control the operating state of the wireless access point. In response to commands from the applications or other events that may influence the operating state of the access point, the control mechanism may determine an appropriate state transition. The state transition may depend both on the current operating state of the wireless access point and other conditions, such as the number of applications using the access point or the number of clients associated with it.

Additionally, when responding to an event, the control mechanism may update stored state information so that subsequent events may also be conditionally processed based on up-to-date state information. The state information may include, for example, the number of applications using the access point, the number of applications using the access point in one or more states or the number of client devices associated with the wireless access point.

Figure 1:
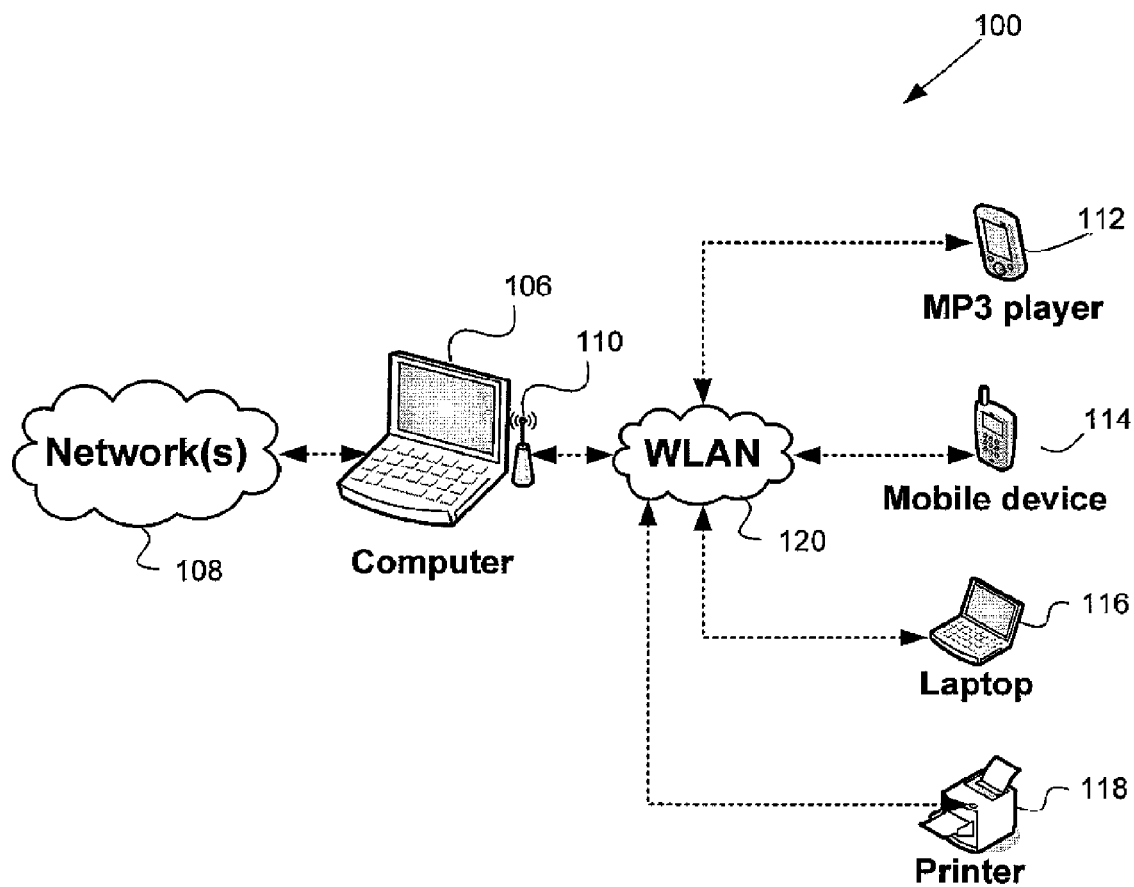
FIG. 1 is a conceptual block diagram of a computer system in which embodiments of the invention may be practiced.

An improved control mechanism according to embodiments of the invention may be implemented in any suitable computing environment. However, FIG. 1 is a conceptual block diagram of a computer environment 100 in which embodiments of the invention may be practiced. The computer environment 100 may be in any suitable location, including home or office and indoor or outdoor, as the invention is not limited in this respect. Computer environment 100 includes a computer, such as laptop computer 106. While laptop computer 106 is a mobile computer, the invention is not limited to being practiced in environments with a mobile computer. In some environments in which the invention is practiced, laptop computer 106 may be connected to one or more external computer network(s) 108, such as the Internet. However, in other environments in which the invention is practiced, a computer such as laptop computer 106 may not have any connection to any external network, such as external computer network(s) 108. If there exists a connection between laptop computer 106 and external computer networks(s) 108, the connection may be over any suitable communications medium, including wired or wireless communications media, as the invention is not limited in this respect.

Laptop computer 106 may include a wireless network interface, and may be configured to act as a wireless access point 110 over the wireless network interface. The wireless access point 110 may communicate using any suitable wireless protocol (e.g., Wi-Fi), as the invention is not limited in this respect. Access point functionality may allow one or more wireless devices to communicate through laptop computer 106 to network 108 or to other devices also associated with the access point in a wireless local area network (WLAN) 120.

Any number or type of devices may communicate with laptop computer 106 by connecting to the wireless access point 110 provided on laptop computer 106. The devices may be any suitable computing devices capable of communicating over a wireless protocol understood by the wireless access point 110. In the computer environment 100, for example, the devices illustrated are MP3 player 112, mobile device 114, laptop 116, and printer 118. In the example illustrated by FIG. 1, each device is of a different device type and serves a different function, but it is to be appreciated that the type or number of devices is not a limiting feature of this invention, as long as each device is capable of communicating over a wireless protocol understood by the wireless access point 110.

A wireless network connection between laptop computer 106 and a device, such as mobile device 114, may be established in any suitable way, as the invention is not limited in this respect. In some environments in which the invention may be practiced, the laptop computer 106 and mobile device 114 may engage in a Wi-Fi Protected Setup handshake, involving inputs from the user, or any other suitable form of enrollment, such as, for example, manual configuration of mobile device 114. The mobile device 114 and laptop computer 106 may then perform an 802.11i and 802.1X key exchange. In some environments in which the invention is practiced, laptop computer 106 may be configured to use different pre-shared-keys (PSKs) for different devices. If the key exchange proceeds successfully, in some environments in which the invention may be practiced, the connection may be successfully established at this point. The steps described above for establishing a connection, however, serve as an example, as any suitable way of establishing a connection between a device and laptop computer 106 may be used. Once a connection is established between the device and the wireless access point 110 on laptop computer 106, the device comprises a portion of the wireless local area network (WLAN 120) hosted by laptop computer 106.

Applications running on laptop computer 106 may communicate with the devices connected to WLAN 120. For example, the user may wish to synchronize email, calendar, or contact information between laptop computer 106 and mobile device 114 using a synchronization application running on laptop computer 106. As an another example, the user of laptop computer 106 may wish to transfer music files between MP3 player 112 and an application running on laptop computer 106 that serves a digital music library. As a third example, the user of laptop computer 106 may wish to run a peer-to-peer application that exchanges data with laptop 116. Laptop computer 106 may also be configured with an application such as a device center that provides a user interface for displaying or managing connections to devices, such as mobile device 114, connecting over the wireless access point 110.

Wireless access point 110 may operate at different times in different states. The operating state of wireless access point 110 at any time may be influenced by actions of the applications executing on laptop computer 106 that access devices connected to WLAN 120. Actions of devices associated with or requesting to associate with wireless access point 110 may also influence the operating state of wireless access point 110. For example, wireless access point 110 may operate in an "active state" in which it is actively beaconing. When operating in a "silent state," wireless access point 110 may listen for communications from devices, without actively beaconing. The wireless access point 110, when operating in an "inactive state," may neither beacon nor listen for communications from wireless devices.

The wireless access point 110 may configure its operating state based on its processing of events, which may originate from any of a plurality of sources. In some embodiments of the invention, the events may be the receipt of commands originating from software components executing on laptop computer 106. The events in some embodiments may additionally or alternatively be communications originating from devices other than laptop computer 106 and be sent over a computer communications medium to which laptop computer 106 is connected. For example, the events may be messages sent over external computer network(s) 108 or may be sent over WLAN 120 by a device such as mobile device 114 and be received through the wireless access point 110. In general, the events may originate from any suitable source or via any suitable communications medium (if the event is not originating from laptop computer 106), as the invention is not limited in this respect.

When events are received from multiple sources, in some embodiments of the invention, the wireless access point 110 may conditionally respond to the events, with the response dependent on the state of the wireless access point 110 at the time of the event and other considerations. For example, in some scenarios, when the wireless access point 110 receives a particular type of event, it may change its configuration to operate in a different state. In other scenarios, however, the wireless access point 110 may respond to the same type of event without making any configuration change.

Any suitable considerations may influence the conditional processing of events, as the invention is not limited in this respect. In some embodiments, the considerations taken into account may include the number of applications actively using the wireless access point 110 and/or the number of devices associated with the wireless access point. The conditional processing may additionally or alternatively be based on a state of operation of the wireless access point 110.

For example, in some embodiments of the invention, the wireless access point 110 may be by default in the inactive state. In some embodiments of the invention, commands may be sent to the wireless access point 110 from software applications executing on laptop computer 106. In the example in which the wireless access point 110 may currently be in the inactive state, an application running on laptop computer 106 that has requested the wireless access point to start communication with one of the devices may send a "start" command to the wireless access point 110. The functions of the application that trigger such a start command are not critical to the invention. However, the command could be triggered by a user starting the synchronization application, for example, to exchange data with a device over WLAN 120, such as mobile device 114. The wireless access point 110 may process the start command, and, based on a number of conditions, may change its state to the silent state. If other applications running on the laptop computer 106 also each send a start command to the wireless access point 110 while it is already in the silent state, the wireless access point may not make any change to its state. In some embodiments of the invention, the wireless access point 110 may keep track of a number of applications which have sent a start command, and use that information as part of its conditional processing. While this may be done in any suitable way as the invention is not limited in this respect, in some embodiments, the wireless access point 110 may maintain one or more counters for this purpose.

Similarly, in the example above, an application executing on the laptop computer 106 may send a stop command to the wireless access point 110. The stop command may be sent from the application to the wireless access point 110 in any suitable way, including via an application programming interface. For example, the stop command may constitute a notification that the application, such as a synchronization application, requests to no longer communicate with devices over WLAN 120. Having received the stop command, wireless access point 110 may process it, and based on one or more conditions, it may change its state from the silent state to the inactive state. In some embodiments of the invention, the wireless access point 110, however, upon processing the stop command, may not make a state change. This decision may take into account any suitable considerations, as the invention is not limited in this respect. In some embodiments, the wireless access point 110 may take into account a number of software applications which have indicated a request to initiate communication over WLAN 120, such as by issuing a start command, which may be tracked in any suitable way, as discussed above. In some embodiments, when the wireless access point 110 determines that no applications have indicated a request to access devices over WLAN 120, in response to a stop command from an application, it may change its state to the inactive state, although the decision to change state may also take into account additional or alternative considerations.

As discussed above, events may originate from any suitable source, including from a device, such as mobile device 114, indicating a request to initiate communication with the laptop computer 106 over WLAN 120. Events may take any suitable form. In some embodiments, the successful association of a device with wireless access point 110 may constitute another example of an event. Based on its processing of the association event, the wireless access point 110 may configure itself to operate in a different state. The decision by wireless access point 110 to operate in a different state may take into account any suitable considerations, as the invention is not limited in this respect. In some embodiments, the decision may be at least partly based on the current state of the wireless access point 110. For example, the wireless access point 110 may be operating in the silent state, but based on its processing of an association event, the wireless access point 110 may transition the active state. However, the wireless access point 110 may not make any configuration state change upon receiving an association event if it is currently already in the active state.

Figure 2:
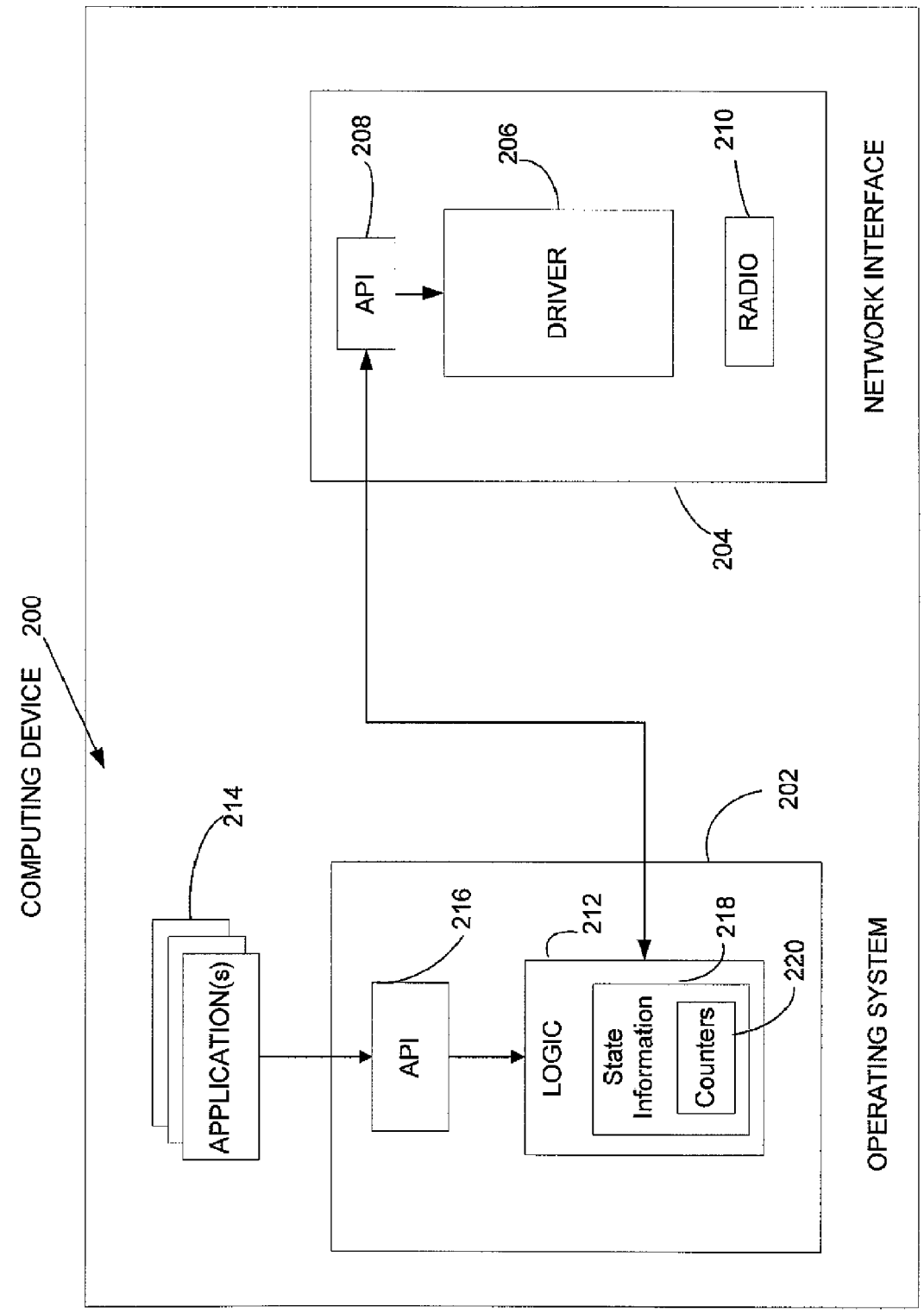
FIG. 2 is a block diagram illustrating an architecture for a wireless access point in accordance with some embodiments of the invention.

FIG. 2 illustrates an architecture of a computing device, such as laptop computer 106, that may be configured as a wireless access point according to some embodiments of the invention. Computing device 200 may include an operating system, which may be any suitable operating system 202, such as a version of Windows Vista® produced by the Microsoft Corporation. Computing device 200 may also include a wireless network interface 204, which may be any suitable combination of hardware and software capable of communicating using a wireless protocol and may be configured to operate in one or more states appropriate for a wireless access point. Network interface 204 may also comprise a component for the physical transmission of signals over a wireless medium, such as radio 210.

It is to be appreciated that components pictured as separate components in FIG. 2 may be grouped together in a single component in some embodiments of the invention, while other embodiments of the invention may include several components to implement the functionality ascribed to a single component in the embodiment illustrated in FIG. 2. Additionally, in some embodiments of the invention, the components may be distributed differently between the operating system 202 and the wireless network interface 204. Components illustrated as being within the wireless network interface 204 may additionally or alternatively be comprised within the operating system 202, and vice versa.

However, the architecture illustrated allows conditional components processing of events to be incorporated into a logic component 212 without requiring applications 214 or network interface 204 to be specially constructed. In the example illustrated by FIG. 2, wireless network interface 204 may comprise a driver 206, which may communicate over an application programming interface (API) 208 to other software components executing on the computing device 200. The driver 206 may control radio 210. Radio 210 may be operable in multiple states which may be set by commands sent to the driver 206 through API 208.

The computing device 200 may include a logic component 212, which may conditionally process events, and may communicate with the wireless network interface 204 via the API 208. Logic component 212 may be implemented using computer-executable instructions or using any other suitable implementation. Logic component 212 may respond to events to determine the operating state of the wireless access point and may generate commands to the wireless network interface 204. The commands may cause configuration changes of the wireless network interface 204 according to the state determined by the logic component 212. One or more application(s) 214 may be executing on the operating system 202. The application(s) 214 may also communicate with the logic component 212 via an API 216. An example application may be a synchronization application which initiates a request to communicate with a device, such as mobile device 114, through the wireless access point 110 in order to synchronize data with the device, as discussed in conjunction with FIG. 1. Applying the example of the synchronization application in FIG. 1 to the architecture illustrated in FIG. 2, a command sent by the synchronization application, such as a "start" command, may be sent over API 216 to the logic component 212 for conditional processing. In the example of the association event discussed in conjunction with FIG. 1, the association event may be sent to the logic component 212 from the wireless network interface 204 over the API 208 for processing. Thus, while events may be sent from any suitable source as the invention is not limited in this respect, in the example illustrated in FIG. 2, logic component 212 may receive events from either application(s) 214 over API 216 or from the wireless network interface 204 via API 208. However, in other embodiments, events may be received from other sources both within and external to the wireless access point 110, as well as via any other suitable computer communications medium.

As discussed in conjunction with FIG. 1, in some embodiments, the wireless access point may be configured to operate in multiple states. As part of its event processing, the logic component 212 may store state information 218 associated with the wireless access point. In some embodiments, at least a portion of the state information may be one or more counters 220, which may track, for example, a number of currently associated devices, or a number of the application(s) 214 which have requested the wireless access point to start communication with one or more devices. However, state information 218 may be tracked in any suitable way, as the invention is not limited in this respect.

Figure 3:
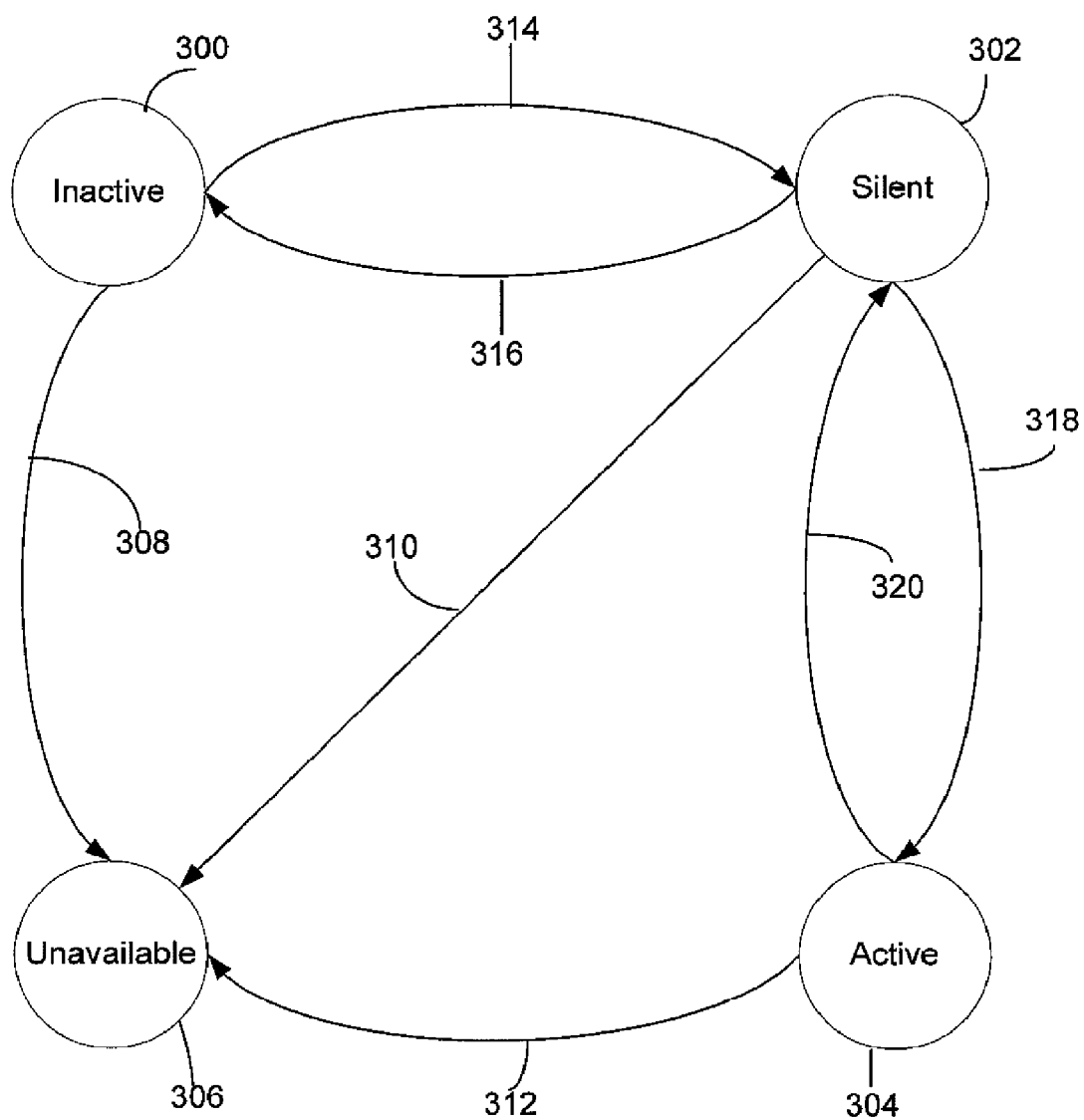
FIG. 3 is a state diagram for a wireless access point in accordance with some embodiments of the invention which may be configured to operate in a number of states, and which may be able to transition between at least a portion of the states based on the receipt and processing of events.

FIG. 3 illustrates a state diagram for embodiments of the invention in which a wireless access point may be configured to operate in a number of states, and may be able to transition between at least a portion of the states based on the receipt and processing of events. The decision whether or not to transition between states may be made at least partly by a software component in the wireless access point, such as logic 212 in FIG. 2. Transitions between states may be effected by commands sent to a wireless network interface, such as wireless network interface 204 illustrated in FIG. 2.

The device may operate in any suitable number or type of states, as this invention is not limited in this respect. The example illustrated in FIG. 3 shows four states: the inactive state 300, the silent state 302, the active state 304, and the unavailable state 306. In the inactive state 300, as discussed in conjunction with FIG. 1, the device may be powered on, but not listening to requests from devices and not sending wireless beacons. If the device is in the silent state 302, it does actively listen for device requests, but does not send wireless beacons. When the device is operating in the active state 304, it both listens for device requests and sends wireless beacons. Additionally, the device may be in an unavailable state 306 in which it cannot readily transition based on the receipt of one or more events to any of states 300, 302, or 304.

As an example of the unavailable state, if the radio 210 discussed in conjunction with FIG. 2 ceases to function, the wireless access point may be unavailable. As indicated by transitions 308, 310, and 312, the wireless access point may transition from any of states 300, 302, or 304 to the unavailable state 306. Multiple possible events or scenarios could cause the functionality provided by the wireless access point to become unavailable. The determination whether to make the wireless access point unavailable may be done in any suitable way, as the invention is not limited in this respect. Additionally, in some embodiments of the invention, a transition to the unavailable state may not be intentional. For example, it may be as a result of a hardware or software failure.

When an application is in the inactive state 300, the processing, such as by the logic component 212 in FIG. 2, of an event may lead the device to transition to the silent state 302. In an embodiment of the invention, the transition 314 from the inactive state 300 to the silent state 302 may be as a result of receiving a "start" command from an application. As discussed in conjunction with FIGS. 1 and 2, the start command may indicate that the application has requested that the wireless access point start communication with a device. For example, a synchronization application may request that the wireless access point start communication with a device, such as mobile device 114, in order to synchronize calendar or email data. Commands from applications to the wireless access point may be sent in any suitable way. In an embodiment of the invention, commands from applications are sent over an API, such as the API 216 in FIG. 2.

The wireless access point may also implement a transition 316 between the silent state 302 and the inactive state 300. Transition 316 may be caused by an application issuing a "stop" command, which may indicate that the application has requested to no longer communicate with any devices through the wireless access point. In some embodiments of the invention, the transition 316 does not occur at every receipt of a stop command, but, conditionally, only upon the receipt of the stop command from the last application which had sent a start command but no follow-on stop command.

A transition 318 from the silent state 302 to the active state 304 may also occur as the result of the processing of events. In some embodiments of the invention, transition 318 may result if any application issues an "advertise" command, in which it indicates that it has requested that the wireless access point advertise the device network. Transition 318 may alternatively or additionally be caused when a device successfully associates with the wireless access point, as discussed in conjunction with FIG. 1.

A transition 320 is also possible in the reverse direction, from the active state 304 to the silent state 302. Transition 320 may occur conditionally when the last active application issues a "hide" command, indicating a request to the wireless access point to hide the device network. This last remaining application in transition 320 refers to the last remaining application which had issued an "advertise" command but no hide command. As with transition 318, in some embodiments, transition 320 may also occur for other reasons. In some embodiments, for example, transition 320 may be caused by an event, such as the receipt of an indication that the last active client has disconnected, or disassociated, from the wireless access point.

Figure 4:
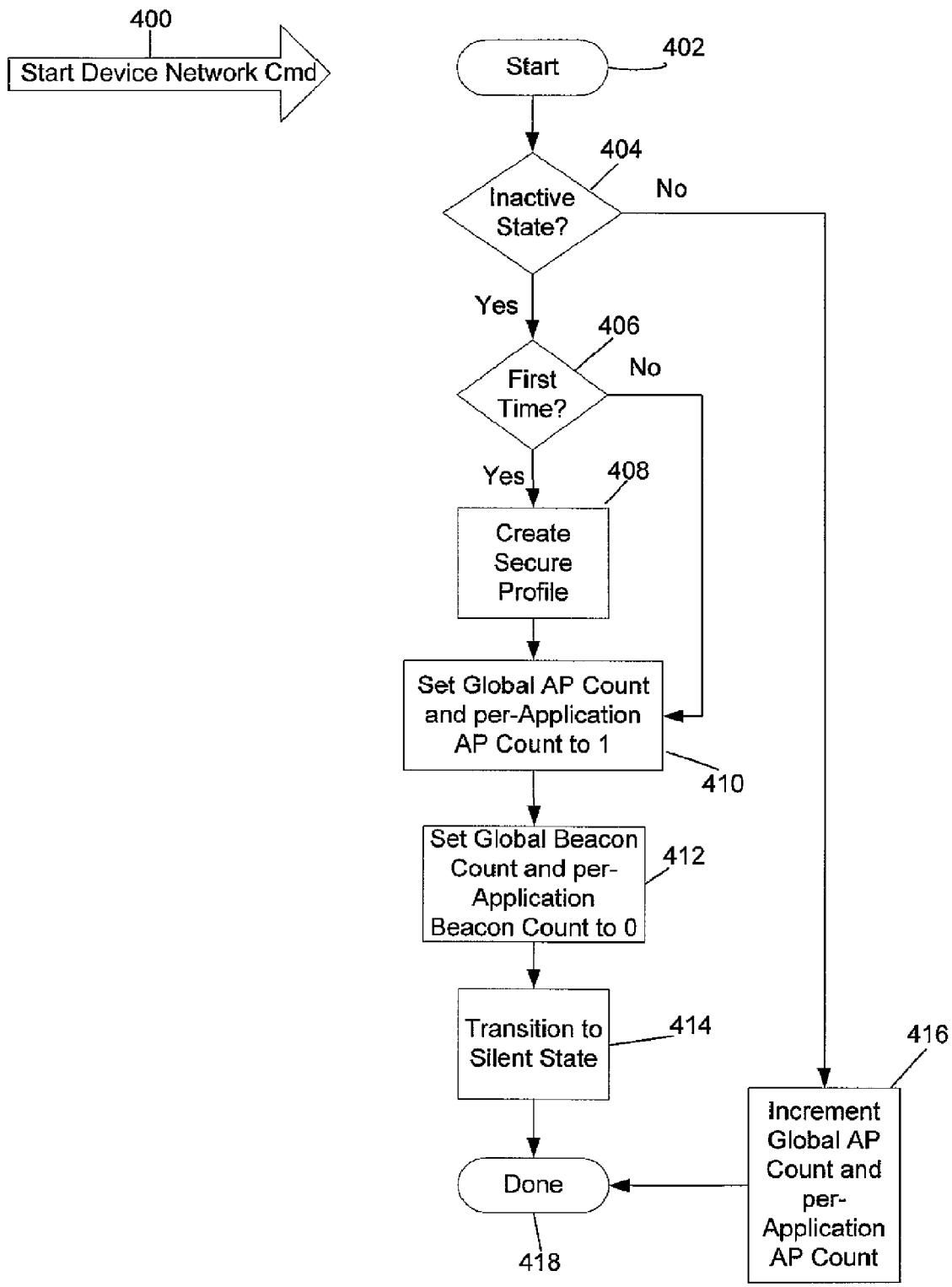
FIG. 4 is a flowchart of processing within the wireless access point in response to a "start device network" command in accordance with some embodiments of the invention.

Embodiments of the invention may process any number or type of events. FIGS. 4 through 7 illustrate processing in response to events that may occur in some embodiments of the invention. FIG. 4 illustrates a flowchart for the conditional processing of the wireless access point of a "start device network" command 400 in accordance with an embodiment of the invention. As discussed above, a start device network command may be sent from an application executing on the wireless access point, and may indicate that the application has requested that the wireless access point start communication with an external device, such as mobile device 114. This flowchart may be implemented in any suitable way. In the embodiment of the invention illustrated by FIG. 2, the logic of the flowchart may be implemented by the logic component 212.

The flowchart starts at block 402 with the receipt of the start device network command 400. At block 404, the process may check whether the wireless access point is currently in the inactive state. Checking the current state of the wireless access point may be done in any suitable way. In the embodiment illustrated by FIG. 2, the process may do so by means of checking state information 218 maintained by logic component 212. Alternatively, the state of the wireless access point may be determined by polling the wireless network interface, such as wireless network interface 204 illustrated by FIG. 2, through API 208. Regardless of the manner of checking the current state of the wireless access point, if the current state is the inactive state, it checks at block 406 if this is the first time the wireless access point has received a request to start communication with any devices (i.e., the wireless access point has not hosted a wireless network before). If so, it may, at block 408, create a secure profile for the hosted network, such as WLAN 120. The secure profile may be created any suitable way, as the invention is not limited in this respect. In the embodiment of the invention illustrated by FIG. 2, the operating system 202 may be configured to select wireless settings that are sufficiently secure and unique by default to host a wireless network.

The process then proceeds to block 410. As discussed in conjunction with FIGS. 1 and 2 above, in some embodiments of the invention, the wireless access point may keep track of the number of current applications which have issued a request to communicate with devices over the wireless access point. While various embodiments of the invention may keep track of this information in a variety of ways, the embodiments illustrated by FIGS. 3 and 4 do so by means of at least one counter. The embodiments of FIGS. 4-7 make use of two counters for this purpose, although other embodiments may make use of a lesser or greater number of counters. A global access point counter (Global AP Count) maintains counts across all applications, and may be used for determining when to start or stop the hosted wireless device network. Additionally, a per-application access point counter (per-Application AP count) maintains a counter for each application.

In some embodiments, the per-Application AP count may be used to validate events received from applications, as well as to clean up the Global AP Count in the event that an application exits abnormally, such as via a crash. Thus, at block 410, the process may initialize the Global AP Count and per-Application AP Count to one. If, at block 406, it was determined that this was not the first time that the wireless access point has received a request to start communication with any devices, the process may skip the secure profile creation at block 408, proceeding to block 410, and performing the same steps as described above.

The flowchart next proceeds to block 412. Some embodiments of the invention also keep track of a number of entities which have indicated a request for the wireless access point to send out beaconing information. While the invention is not limited to the type of entity which has requested beaconing from the wireless access point, in some embodiments of the invention, a device may trigger an event indicating a request for beaconing. In other embodiments, an application executing instructions on the same computing device as that which is configured to act as a wireless access point may also request beaconing from the wireless access point. As in the discussion of the AP count above, this information may be tracked in any suitable way. In the embodiment of the invention illustrated by FIG. 4, the information is tracked using an additional set of one or more counters, referred to in this embodiment as beacon counters. As in the discussion of the AP counters above, applications tracking this information using counters may do so using any suitable number of counters. In the embodiments of FIGS. 4-7, this information is tracked using two counters. A Global Beacon Count may record references across all applications, and may be used for determining when to advertise or hide the wireless device network. Additionally, a per-Application Beacon Count may be maintained for each application, and may be useful for validating events received from applications, as well as to clean up the Global Beacon Count in the event that an application exits abnormally, such as via a crash. In block 412, both the Global Beacon Count and the per-Application Beacon Count may be initialized to zero. In the embodiment of the invention illustrated by FIG. 4, the sending of a start device network command by an application does not indicate that the application requests beaconing. Other embodiments of the invention may have different states or different types of commands from the embodiment illustrated by FIG. 4, in which case the one or more beacon counters may be set to a value other than zero.

The flow proceeds to block 414, in which the wireless access point transitions its state to the silent state, which in the embodiment discussed in conjunction with FIG. 3 signifies that the wireless access point listens for device requests but does not send beacons.

Returning momentarily to block 404, in which a check is performed of the current operating state of the wireless access point, the process may branch depending on the current operating state. In block 404, if the wireless access point determines that its current state is not the inactive state, the flow proceeds to block 416, in which it increments the Global AP Count and the per-Application AP Count, discussed in conjunction with block 410 above. The discussion above does not take into account embodiments which may include an "unavailable state," as discussed in conjunction with FIG. 3. In embodiments with the unavailable state, the Global AP Count and the per-Application AP Count would not be incremented if the current state is the unavailable state.

The processing of the start device network command may be finished at this point; accordingly, the flow may proceed to end block 418.

Figure 5:
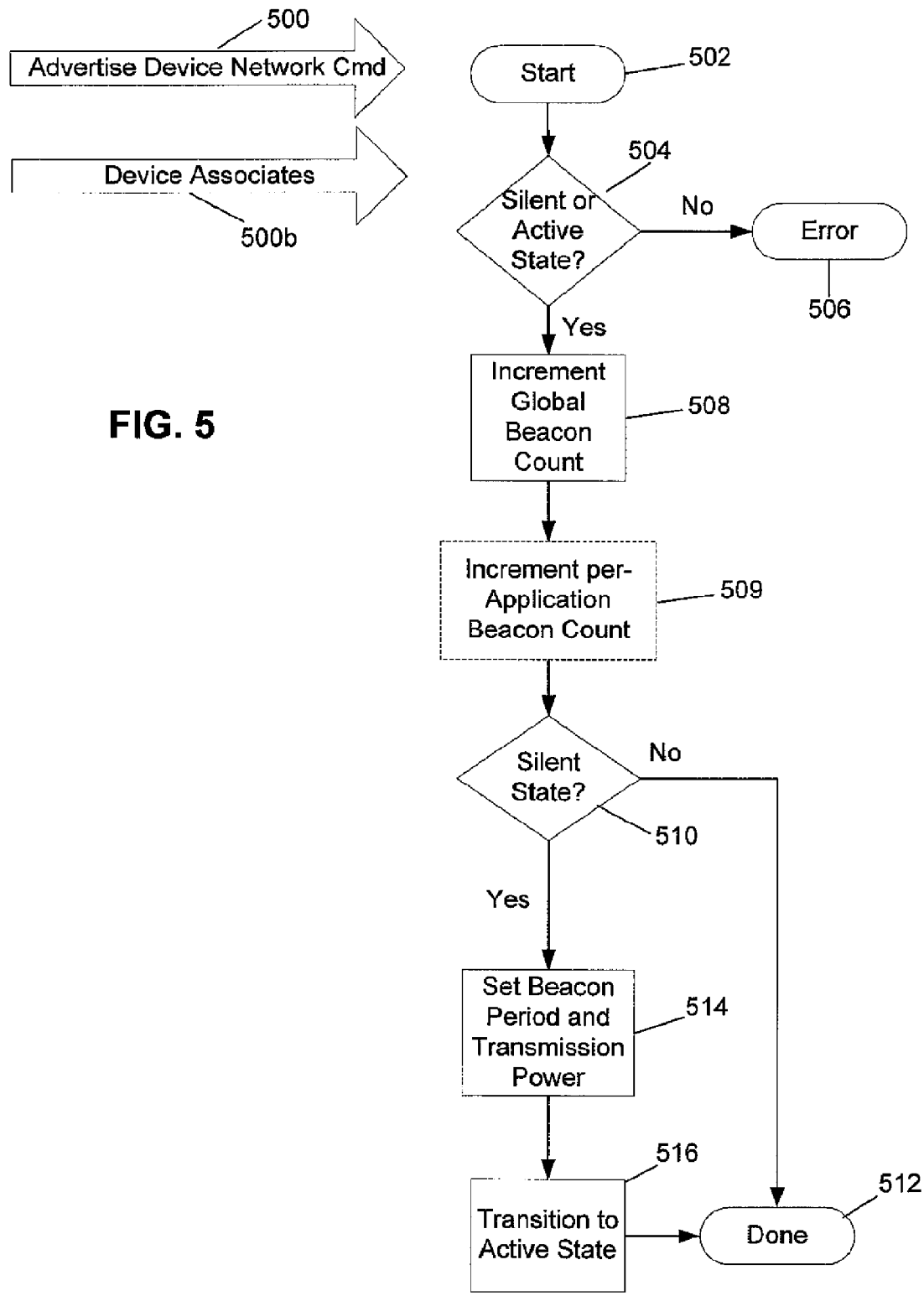
FIG. 5 is a flowchart of processing within a wireless access point of an "advertise device network" command in accordance with some embodiments of the invention.

FIG. 5 illustrates a flowchart for the conditional processing of an "advertise device network" command 500 in accordance with an embodiment of the invention. As discussed above in conjunction with FIG. 3, the advertise device network command may be sent from an application executing on a device, such as computing device 200 in FIG. 2, configured to act as a wireless access point, and may signify that the application requests beaconing from the wireless access point. As with FIG. 4, in the embodiment of FIG. 2, the process of the flowchart of FIG. 5 may be controlled by logic component 212.

The flowchart starts at block 502 with the receipt of the advertise device network command 500. At block 504, the process may check if the access point is currently operating in the silent state or the active state. As discussed in conjunction with FIG. 4, in the embodiment illustrated by FIG. 2, the process may check the state by means of state information 218. If the current state is not the silent state or the active state, the process may terminate with an error at block 506. The process may perform any suitable processing in response to an error condition, and different error conditions may elicit different responses, as the invention is not limited in this respect. In an embodiment of the invention, the advertise command 500 may only be validly received while the wireless access point is operating in the silent state or the active state.

Otherwise, the flowchart proceeds to blocks 508 and 509, in which it may increment the Global Beacon Count and per-Application Beacon Count, respectively, discussed in conjunction with FIG. 4. The process may then branch at block 510, depending on whether the wireless access point is in the silent state. If it is not in the silent state, in some embodiments of the invention, the process may assume it is already in the active state, at which point it may be done processing the advertise command, and may proceed to block 512.

If the process determines at block 510 that it is in the silent state, it proceeds to block 514, in which it may set the beacon period and transmission power. In some embodiments of the invention, the beacon period and transmission power may be set in such a way as to reduce the power consumption of the wireless access point, as well as the power consumption of any devices connecting through it. In some embodiments of the invention, setting the beacon period and transmission power may effectively turn on beaconing. Setting the beacon period and transmission power may be done in any suitable way, including in the embodiment of FIG. 2 by sending one or more commands to the wireless network interface 204 through API 208.

The flow then proceeds to block 516, in which the process may transition to the active state. In some embodiments of the invention, the processing of the advertise device network command may be finished at this point, and the process may proceed to end block 512.

As discussed in conjunction with FIG. 3, in some embodiments of the invention, the receipt of additional or alternative events, such as the successful association 500b of a device with the wireless access point, may also signify a requirement for the access point to send beacons. In some embodiments of the invention, the successful association 500b of a device may follow a similar process as that illustrated by the flowchart of FIG. 5. In the embodiment of the invention illustrated by FIG. 5, the successful association 500b of a device follows an identical process as the receipt of an advertise device network command with the exception of block 509, illustrated with a dashed border, which may not apply to the successful association 500b of a device.

Figure 6:
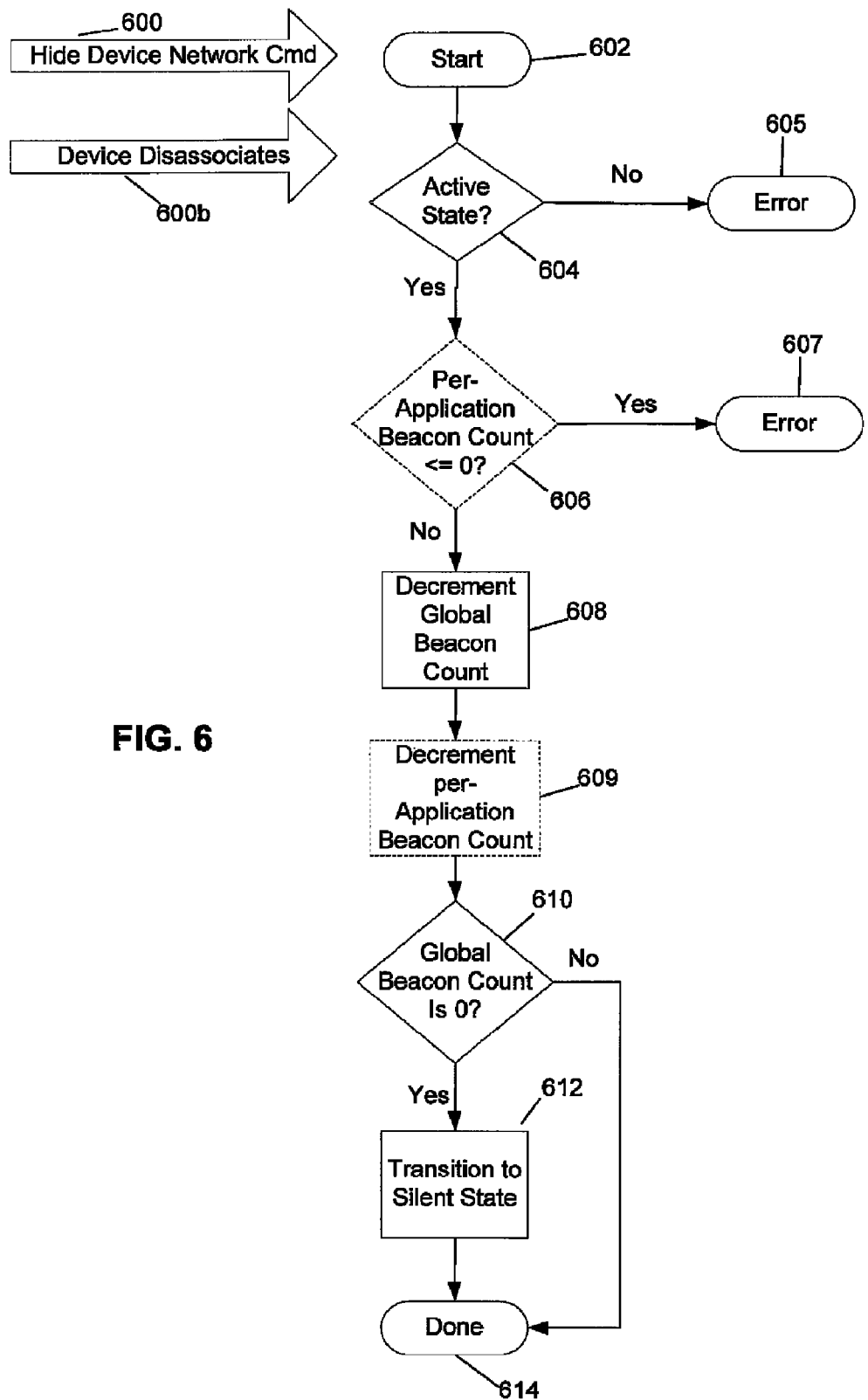
FIG. 6 is a flowchart of processing within a wireless access point of a "hide device network" command in accordance with some embodiments of the invention.

FIG. 6 illustrates a flowchart for the conditional processing of a "hide device network" command 600 in accordance with an embodiment of the invention. As discussed above in conjunction with FIG. 3, the hide device network command may be sent from an application executing on the wireless network, and may signify that the application no longer requires beaconing from the wireless access point. As with FIG. 4, in the embodiment of FIG. 2, the process of the flowchart may be controlled by logic component 212.

The flowchart starts at block 602 with the receipt of the hide device network command 600. At block 604, the process may check whether it is in the active state. As discussed in conjunction with FIGS. 4 and 5, in the embodiment illustrated by FIG. 2, the process may check its state by means of state information 218. If the process determines at block 604 that the wireless access point is not currently operating in active state, the process may proceed to block 605, in which it may terminate with an error.

In some embodiments, the hide device network command cannot be validly processed if the per-Application Beacon Count, discussed in conjunction with FIG. 4, is not greater than zero, since the per-Application Beacon Count should have been incremented upon the receipt of a corresponding advertise network command 500 for the same application. Accordingly, at block 606, the process may check whether the per-Application Beacon Count is less than or equal to zero, and if so, it may terminate with an error at block 607.

Otherwise, the process may proceed to block 608, at which point it may decrement the Global Beacon Count, which was discussed in conjunction with FIGS. 4 and 5 above. Proceeding to block 609, the process may then decrement the per-Application Beacon Count. At step 610, the process may then check if the current Global Beacon Count is set to zero. If not, then the processing of the hide device network command may be finished, and the flow may proceed to end block 614. If the current beacon count is set to zero, in block 612, the process may transition to the silent state, as discussed in conjunction with FIG. 3, and then may proceed to end block 614.

As discussed in conjunction with FIG. 5, in some embodiments of the invention, the receipt of additional or alternative events, such as the disassociation 600b of a device with the wireless access point, may signify that the device no longer requires beaconing from the wireless access point. In some embodiments of the invention, disassociation 600b of a device may follow a similar process as that illustrated by the flowchart of FIG. 6. In the embodiment of the invention illustrated by FIG. 6, the disassociation 600b of a device with the access point follows an identical process as the receipt of a hide device network command with the exception of blocks 606 and 609, illustrated with a dashed border, which may not apply to the disassociation 600b of a device.

Figure 7:
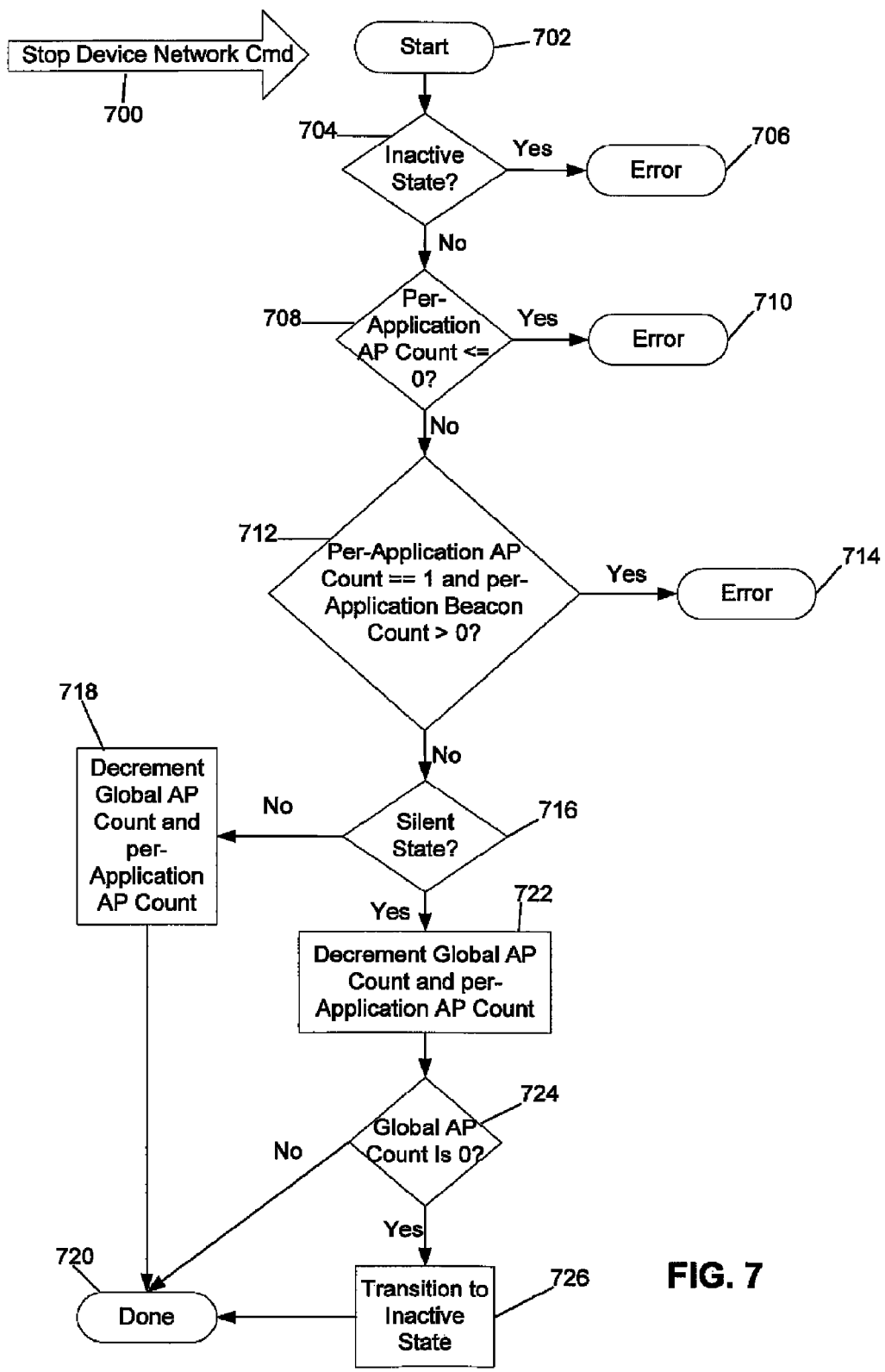
FIG. 7 is a flowchart of processing within a wireless access point of a "stop device network" command in accordance with some embodiments of the invention.

FIG. 7 illustrates a flowchart for the conditional processing of a "stop device network" command 700 in accordance with an embodiment of the invention. As discussed above in conjunction with FIG. 3, the stop device network command may be sent from an application executing on the wireless network, and may indicate that the application has issued a request to no longer communicate with an external device, such as mobile device 114, through the wireless access point. As with FIG. 4, in the embodiment of FIG. 2, the logic of the flowchart may be implemented by logic component 212.

The flowchart starts at block 702 with the receipt of the stop device network command 700. At block 704, the process may check whether it is in the inactive state. As discussed in conjunction with FIG. 4, in the embodiment illustrated by FIG. 2, the process may check its state by means of state information 218. In some embodiments of the invention, if the process determines at block 704 that it is currently operating in the inactive state, it may proceed to block 706, in which it may terminate with an error.

Otherwise, the process proceeds to block 708, in which it may check whether the per-Application AP Count, discussed in conjunction with FIG. 4, is less than or equal to zero. If it is, the process may terminate with an error in block 710. If not, at block 712, the process may check if the per-Application AP Count is equal to 1 and the per-Application Beacon Count is greater than zero. If both conditions are true, the process may terminate with an error in block 714.

Otherwise, the process proceeds to block 716 in which it checks whether its current state of operation is the silent state. If it is not in the silent state, in some embodiments of the invention, the process may then assume it is in the active state. It may then proceed to block 718, in which it may decrement the Global AP count and per-Application AP Count, which was discussed in conjunction with FIG. 4. Some embodiments of the invention may have at that point finished processing stop device network command, and proceed to end block 720.

Returning to block 716, if the process instead determines that the wireless access point is currently operating in the silent state, at block 722, it may it may decrement the Global AP count and per-Application AP Count. At block 724, the process may then check to see whether the Global AP count is set to zero. If the Global AP count is not set to zero, the processing may be finished at this point, and it may proceed to end block 720. If, on the other hand, the Global AP count is set to zero, the process may transition in block 726 to the inactive state, at which point the process may now have finished processing the stop device network command, and may proceed to end block 720.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments of the invention may be provided using a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, embodiments of the invention may be provided via a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a wireless network access point (WAP) that maintains operating state information that controls switching of the WAP between first, second, and third operating states, the WAP comprising a radio, the operating state information controlling whether the WAP enters the first operating state in which the WAP listens with the radio but does not transmit beacons with the radio, the operating state information controlling whether the WAP enters the second operating state in which the WAP transmits beacons with the radio but does not listen with the radio, and the operating state information controlling whether the WAP enters the third operating state in which the WAP both listens and transmits beacons with the radio, the method comprising:
    monitoring for and detecting events indicative of uses of the WAP by applications running on the WAP and/or by wireless client devices, wherein detected events are responded to by updating the operating state information accordingly;
    in response to detecting an event, selecting one of the operating states for the WAP based on the event and based on the operating state information which has been updated according to one or more detected events, wherein the operating state information indicates either or both a number of applications or a number of wireless clients in at least one state of use of the wireless network access point; and
    configuring the WAP to operate in the selected operating state.

2. The method of claim 1, wherein:
when in the third operating state, the WAP is beaconing and listening for connection requests from wireless devices;
a fourth operating state comprises an operating state in which the WAP is neither beaconing nor listening for connection requests from wireless devices.

3. The method of claim 2, wherein:
when the WAP is in the fourth operating state and the event comprises a command from an application to start the WAP:
    selecting the operating state comprises selecting the first operating state; and
    updating the operating state information comprises storing an indication that one application requested silent operation of the WAP.

4. The method of claim 3, wherein:
when the WAP is in the fourth operating state and the event comprises a command from an application to start the WAP:
    selecting the operating state comprises selecting the first operating state; and
    updating the operating state information comprises increasing an indication of the number of applications requesting silent operation of the WAP.

5. The method of claim 4, wherein:
when the WAP is in the first operating state and the event comprises a command from an application to stop the WAP:
    selecting the operating state comprises selecting the first operating state when the indication of the number of applications requesting silent state operation is greater than one;
    updating the operating state information comprises decreasing the indication of the number of applications requesting silent state operation of the WAP; and
    selecting the operating state comprises selecting the fourth operating state when the updated indication of the number of applications requesting silent state operation indicates no applications.

6. The method of claim 2, wherein:
when the WAP is in the first operating state and the event comprises a command from an application to advertise the WAP:
    selecting the operating state comprises selecting the third operating state; and
    updating the state information comprises storing an indication that one application has requested beaconing by the WAP.

7. The method of claim 6, wherein:
when the WAP is in the third operating state and the event comprises a command from an application to advertise the WAP:
    selecting the operating state comprises selecting the third operating state; and
    updating the state information comprises increasing an indication of the number of applications that have requested beaconing by the WAP.

8. The method of claim 7, wherein:
when the WAP is in the active state and the event comprises a command from an application to hide the WAP:
    selecting the operating state comprises selecting the third operating state when the indication of the number of applications that have requested beaconing by the WAP indicates that more than one application has requested beaconing;
    updating the state information comprises decreasing the indication of the number of applications that have requested beaconing by the WAP; and
    selecting the operating state comprises selecting the first operating state when the updated indication of the number of applications that have requested beaconing by the WAP indicates that no application has requested beaconing.

9. A computer storage device comprising computer-executable instructions thereon, the computer-executable instructions comprising:

an interface for an access point, the interface adapted to, when executing:
control which of the following operating states the access point enters and exits: an operating state for transmitting beacons with an antenna thereof and not listening with the antenna, an operating state for listening with the antenna and not sending beacons, and an operating state for both transmitting beacons and listening with the antenna;
receive a command from an application;
responsive to receiving the command, determine which of the operating states the access point is to enter based on the command and based on stored state information relating to operation of the access point, wherein the stored state information comprises either or both a count of a number of applications using the access point or a count of a number of wireless client devices associated with the access point, wherein the stored state information is dynamically updated by counting either or both interactions with the access point by the applications or by the wireless client devices; and
generate a command to the access point to place the access point in the determined operating state.

10. The computer storage device of claim 9, wherein the interface is further adapted to, when executing:
receive from the access point an indication of a successful association with a wireless device; and
update the stored state information to indicate correspond to the wireless device being associated with the access point.

11. The computer storage device of claim 10, wherein the interface is further adapted to, when executing:
receive from the access point an indication of disassociation of a previously associated wireless device;
determine an operating state of the access point based on the disassociation of a previously associated wireless device and stored state information; and
update the stored state information to correspond to the wireless device being disassociated from the access point.

12. The computer storage device of claim 11, wherein the interface is adapted such that when executing the interface updates the stored state information to correspond to the wireless device being associated with the access point by increasing a count representative of beaconing requests.

13. The computer storage device of claim 12, wherein the interface is adapted to, when executing, in response to receiving the indication of disassociation of a previously associated wireless device:
decrease the count of beaconing requests by one; and
when the decrease causes the count of beaconing requests to be zero, determine the operating state of the access point based on the disassociation of the previously associated wireless device and the stored state information by determining the operating state to be a state in which the access point does not actively beacon.

14. The computer storage device of claim 13, wherein the interface is adapted to, when executing:
in response to receiving a command from an application to actively beacon, increase the count representative of beaconing requests by one; and
in response to receiving a command from an application to hide the access point, decrease the count representative of beaconing requests by one.

15. A computing device comprising:
an access point configurable to operate in a plurality of states, the plurality of states comprising an active state, an inactive state and a silent state; and
a memory comprising computer-executable instructions thereon, the computer-executable instructions comprising:
a plurality of applications; and
an interface for the access point, the interface adapted to:
receive a command from an application of the plurality of applications;
receive from the access point an indication of a successful association with a wireless device;
receive from the access point an indication of disassociation from the access point of a previously associated wireless device;
determine an operating state of the access point based on stored state information relating to operation of the access point and one or more of the command, the indication of a successful association and the indication of the disassociation; and
generate a command to the access point to place the access point in the determined operating state, wherein the determined operating state comprises the silent state based on at least one of:
the stored state information comprising the inactive state and the command comprising a command requesting the access point to start a communication with at least one wireless device,
the stored state information comprising the active state and the command comprising a command from a last application operating in the active state requesting the access point to hide the access point, or
the stored state information comprising the active state and the indication of the disassociation comprising an indication that a last wireless device operating in the active state has disassociated from the access point.

16. The computing device of claim 15, further comprising:
a plurality of counters, wherein the stored state information comprises the values in the plurality of counters.

17. The computing device of claim 16, wherein:
a first counter of the plurality of counters stores a count of a number of associated wireless devices; and
the interface is adapted to, in response to receiving an indication of disassociation of a previously associated wireless device, decrease the first counter by one.

18. The computing device of claim 17, wherein:
a second counter of the plurality of counters stores a count of a number of commands received to start the access point; and
the interface is adapted to, in response to receiving a command to stop the access point, decrease the second counter by one.

19. The computing device of claim 16, wherein the plurality of applications comprises at least one application adapted to synchronize data with a wireless device.

* * * * *